United States Patent [19]

Pavan

[11] Patent Number: 4,699,048
[45] Date of Patent: Oct. 13, 1987

[54] MACHINE FOR DRYING PASTA OR THE LIKE FOOD PRODUCTS

[76] Inventor: Mario Pavan, Via Monte Grappa 30, Galliera Veneta, (Province of Padova), Italy

[21] Appl. No.: 840,340

[22] Filed: Mar. 17, 1986

[30] Foreign Application Priority Data

Mar. 21, 1985 [IT] Italy ................ 41530 A/85

[51] Int. Cl.⁴ ............................ A23B 7/00; A23L 3/00
[52] U.S. Cl. ................................................ 99/470; 34/62; 34/66; 34/151; 99/483; 99/516
[58] Field of Search ................ 99/467, 470, 483, 516, 99/517; 34/41, 62, 66, 151

[56] References Cited

U.S. PATENT DOCUMENTS 1,246,515  11/1917  DeNard et al. .................... 34/66
1,334,840  3/1920  Collins ................................ 34/66

FOREIGN PATENT DOCUMENTS 0109764  6/1984  Japan ................................ 99/470

Primary Examiner—Timothy F. Simone
Attorney, Agent, or Firm—Guido Modiano; Albert Josif

[57] ABSTRACT

The machine comprises a pre-heater followed by a first chamber, incorporating heated plates wherebetween a food product to be dried is passed. The machine also comprises a successive section, wherethrough the food product is conveyed to a second chamber, incorporating cooled plates, wherebetween the food product is passed. The plates are adapted for rapidly condensing moisture contained in the ambient air and in the food product itself, to further rapidly reduce its moisture content to approximately 13–14%.

3 Claims, 4 Drawing Figures

4,699,048

MACHINE FOR DRYING PASTA OR THE LIKE FOOD PRODUCTS

BACKGROUND OF THE INVENTION

This invention relates to a machine for drying pasta or the like food products.

It is known that pasta is dried, for long-term preservation, to a moisture content as low as 12% to 13%.

On completion of the processing cycle, prior to drying, pasta with a high moisture content (15-35%) behaves like a plastic material within which capillarly grids form which spread moisture throughout the product, enabling it to migrate from the middle toward the periphery as the outer surface is being subjected to evaporation.

For a smooth drying process, it is mandatory that such capillaries be left open, and the product quality rating requires that associated volume shrinkage upon drying creates no stresses within the product.

These stresses, in fact, if retained on completion of the drying process originate a consequent phenomenon of micro-cracks being formed in the product, which is a cause of the product fragility.

In practice, a microcracked product is easily crumbled during the storage, packaging, and cooking steps.

Such a product type has a low commercial quality rating.

SUMMARY OF THE INVENTION

It is an aim of this invention to provide a machine which affords optimum drying of pasta or the like food products.

Within the above aim, it is an object of the invention to provide a machine which affords a high-temperature drying process yielding a product which is not microcracked and, accordingly, sufficiently strong to resist crumbling during the storage, packaging and cooking steps.

A further object is to provide a machine which affords a good quality product and a reduction of processing waste.

Another object is to provide a machine which affords an improved process with savings both in time and machine wear.

These and other objects to become apparent hereinafter, are achieved by a machine for drying pasta or the like food products, comprising a first drying section extending substantially horizontally, followed by a second substantially vertical hot labyrinth section and a third section extending substantially horizontally, characterized in that between said second and third sections there is interposed at least one section comprising a first horizontal portion followed by a vertical cold plate labyrinth, on said plates there intensively condensing the ambient moisture determined by the temperature and moisture content of the food product itself which undergoes concurrently a sharp temperature drop.

BRIEF DESCRIPTION OF THE DRAWINGS

Further features and advantages of the invention will be apparent from a detailed description of a preferred embodiment thereof, given here by way of illustration and not of limitation with reference to the accompanying drawing, wherein.

DESCRIPTION OF THE PREFERRED EMBODIMENTS

With reference to the cited drawing figures, the machine for drying pasta or the like food products according to the invention comprises a conventional pre-drier 1, wherein cams or rods from which the pasta, e.g. spaghetti, is suspended, follow a path 2 in a hot, damp climate which can be conditioned as desired.

Along this path, by virtue of air convection and change, the pasta is heated and loses moisture until its moisture content is reduced to between 16% to 18%.

The pre-drier 1 temperature is substantially in the order of 85° to 90° C. and the residence time is approximately 30 to 60 minutes, though obviously these conditions may be varied according to contingent requirements, for example it may be convenient to increase the temperature and decrease the residence time or vice versa.

Of course, it will be appreciated that whilst, by way of example, reference is made to spaghetti, the machine according to the invention may be used for processing any types of pasta, or similar food product, by the mere adoption of different and adapted elements, already known in the art and unrelated to this invention.

Figure 1:
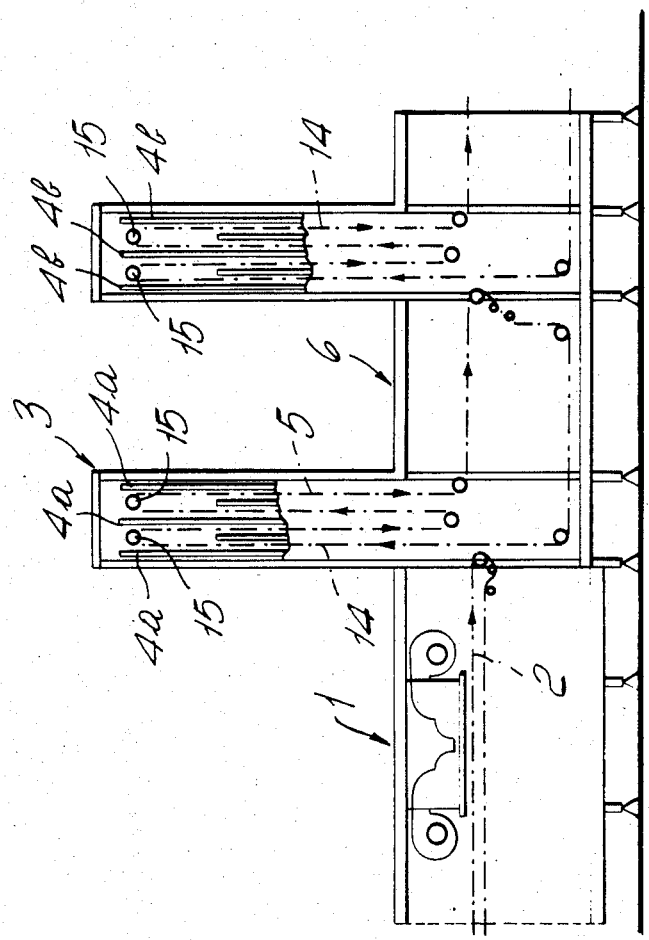
FIG. 1 shows diagrammatically a machine according to the invention.

On completion of the first pre-drying step, the pasta is fed into a first substantially vertical labyrinth chamber 3 wherein plates indicated by the reference numeral 4a in FIG. 1, are adapted for maintaining a high temperature and high humidity environment.

Figure 2:
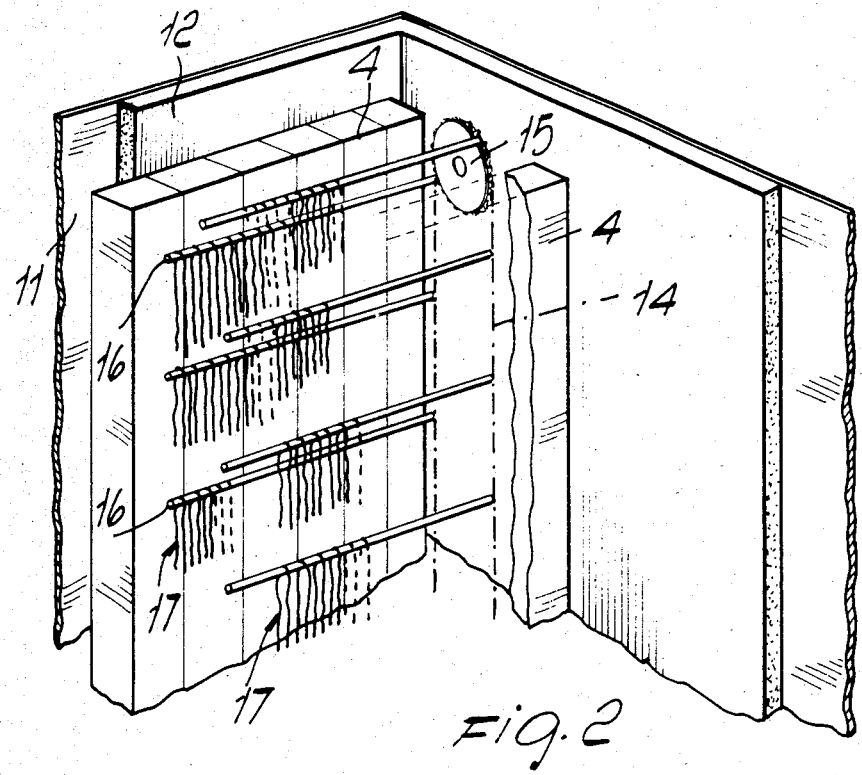
FIG. 2 is a fragmentary cut-away perspective view of a heating or cooling chamber of the machine.

More precisely, and with reference to drawing FIG. 2, the pasta is transported from the pre-drier 1 to the first chamber 3 by a conveyor mechanism, advantageously comprising a pair of chains 14 having rods 16 extending therebetween for supporting the pasta, generally indicated by the reference numeral 17. The chain runs may be composed of a series of closed loop chains, as shown schematically in FIG. 1, or may alternatively comprise just two continuous closed loops. The chains are expediently guided by means of sprocket wheels 15, rotatably mounted on the chamber walls. One or more of the sprocket wheels, corresponding in number to the number of closed loop chain runs, may be driven by a convenient power source such as an electric motor unit and appropriate transmission means.

Figure 3:
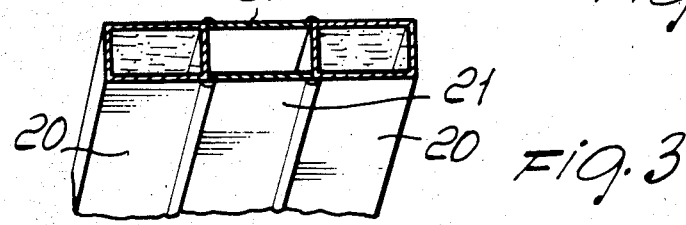
FIG. 3 is a partly sectional perspective detail view of a heating or cooling plate incorporated in the chamber of FIG. 2.

The first chamber 3 comprises an outer wall 11, covered by a panel or layer of thermal insulating material 12, and a pair of plates 4 extending laterally across the chamber 3. As illustrated in FIG. 3, the plates 4 advantageously comprise a series of tubular elements or tubes 20, interposed by plates 21, and being closed by a head member 22, such that fluid such as water may be caused to flow through the tubes 20. In the case of the first chamber 3, hot fluid is caused to flow through the tubes 20 to heat the plates 4, (indicated at 4a in FIG. 1), wherebetween the chains 14, and rods 16 extending therebetween for carrying pasta 17, are guided by means of sprocket wheels 15. Obviously, the layout of tubes 20 and the configuration of the head 22 may be selected to obtain any desired flow pattern according to contingent requirements, and any suitable fluid heating means may be used.

Moving along the path defined by the chain 14 runs, as schematically illustrated in FIG. 1 and indicated by the reference numeral 5, inside said first substantially vertical chamber 3, the pasta loses no appreciable amounts of moisture, while there occurs homogenization of both temperature and degree of moisture throughout the pasta mass.

Figure 4:
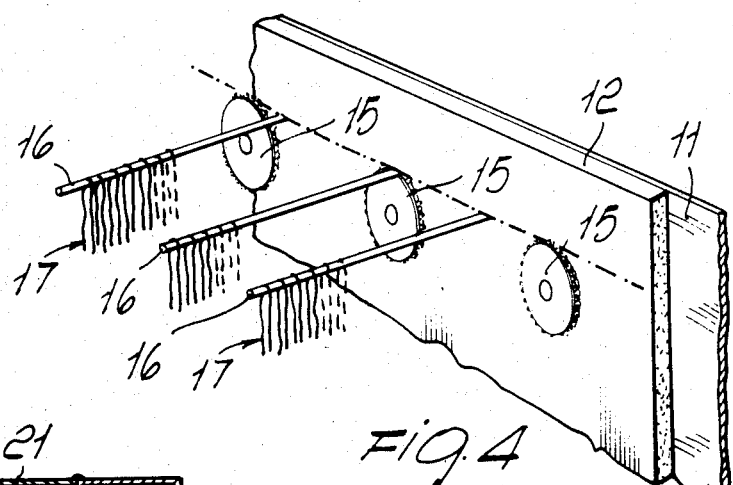
FIG. 4 is a cut-away perspective view of a conveyor for transporting pasta or the like food products from a first heating chamber to a second cooling chamber in the machine for drying pasta according to the invention.

Downstream of this second path 5, the pasta is next conveyed via a variable length horizontal connection 6, illustrated in FIG. 4, to a second substantially vertical labirinth chamber 7 wherein further plates 4b (FIG. 1), also consisting of flat plates or smooth or finned pipes, are maintained at a low temperature. The structure of the second chamber 7, is exactly the same as the structure of the first chamber 3, as illustrated in FIG. 2, however, in the second chamber, the tubes 20 of the plates 4 are utilized for conducting a cold fluid, which may be for example, water maintained at a suitably low temperature by a refrigeration unit.

Thus, the surfaces of the plates 4 are adapted to rapidly condensate intensive amounts of moisture contained in the ambient air and the pasta itself. By virtue of the cited structural arrangement, the pasta undergoes in this labyrinth chamber 7, a very sudden and sharp drop in moisture content and temperature but without this being accompanied by any detrimental changes in capillarity characteristics and without the generation of stresses or microcracks in the pasta structure.

At the end of this treatment and upon leaving the second chamber 7, the moisture content of the pasta may be conveniently close to 13-14%, thereby it becomes possible to convey the pasta to a final drying station comprising a conventional type of drier.

It will be appreciated that an improvement in the machine consists, according to one aspect of the invention, of interposing a hot labyrinth chamber between a pre-drier and a cold labyrinth chamber, adapted for suitably lowering the temperature and moisture content of the heated pasta to selected levels for introduction into the end drier.

In order to provide a flow of fluid through the tubes 20, pump means may be provided, or alternatively, fluid may be gravity fed from a suitable header tank. Furthermore, the system may be completely sealed and even pressurized, depending upon operating temperature requirements, production rate, etc.

From actual tests carried out it has been found that the rapid removal of mosisture and sudden drop in temperature prevent alteration of the internal grid and the structure of the pasta, and above all, that the pasta is neither microcracked nor fragile at the end of the process.

The improvements made to the machine are especially simple, being substantially composed of interposing a further labyrinth chamber where the hot plates, already known, have been merely replaced with plates or systems adapted to be maintained at a low temperature.

Construction-wise, the improvements are neither complicated nor expensive, while the benefits of product quality are considerable and significant.

In fact, the machine according to the invention permits the obtainment of a finished product which is strong, with inherently low waste in the storage and packaging operations, and which is of excellent quality.

Of course, the machine herein may be embodied in several different ways while observing the same concept of interposing, in the drying process, a step involving a sharp reduction in temperature and humidity within a short time lapse by passing the pasta between cold plates, without making recourse to artifically induced convection.

Of course, the machine dimensions, components and materials may be any selected ones to meet individual requirements.

I claim:

1. In a machine for drying pasta and the like food products comprising a pre-heater and a final drier, the combination of:

a substantially vertical hot labirinth section arranged downstream of said pre-drier, said hot labirinth section including lateral delimiting walls encircling a hot labirinth chamber accomodating a first plurality of vertical plate means extending parallel to each other and laterally separating between each other hot treatment sectors;

a first substantially horizontal connection portion having an inlet end connected to said hot labirinth section and an outlet end opposite to said inlet end;

a substantially vertical cold labirinth section connected at said outlet end of said first substantially horizontal connection portion, said cold labirinth section including lateral delimiting walls encircling a cold labirinth chamber accomodating a second plurality of vertical plate means extending parallel to each other and laterally separating between each other substantially vertical cold treatment sectors;

a second substantially horizontal connection portion having an own inlet end connected to said cold labirinth section and an own outer end, opposite to said own inlet end, connected to said final drier;

conveyor means extending from said pre-drier to said final drier within said hot treatment sectors, said first substantial horizontal connection portion, said cold treatment sectors and said second substantially horizontal connection portion;

wherein said first plurality of vertical plate means comprises tubular members flown by a hot fluid and said second plurality of vertical plate means comprises tubular members flown by a cold fluid for causing condensation of moisture present in the treated pasta and the like food products on said second plurality of vertical plate means.

2. In a machine for drying pasta and the like food products comprising a pre-heater and a final drier, the combination of:

a subtantially vertical hot labirinth section arranged dowstream of said pre-drier, said hot labirinth section including insulated, lateral delimiting walls encircling an upwardly projecting hot labirinth chamber accomodating a first plurality of vertical plate means extending parallel to each other across said hot labirinth chamber and laterally separating between each other adjacent hot treatment sectors extending;

a first substantially horizontal connection portion having an inlet end connected to said hot labirinth section and an outlet end opposite to said inlet end;

a substantially vertical cold labirinth section connected at said outlet end of said first substantially horizontal connection portion, said cold labirinth section including insulated, lateral delimiting walls encircling an upwardly projecting cold labirinth chamber accomodating a second plurality of vertical plate means extending parallel to each other across said cold labirinth chamber and laterally separating between each other adjacent, substantially vertical cold treatment sectors;

a second substantially horizontal connection portion having an own inlet end connected to said cold labirinth section and an own outer end, opposite to said own inlet end, connected to said final drier;

conveyor means extending from said pre-drier to said final drier within said hot treatment sectors, said first substantial horizontal connection portion, said cold treatment sectors and said second substantially horizontal connection portion;

wherein said first plurality of vertical plate means comprises tubular members flown by a hot fluid and said second plurality of vertical plate means comprises tubular members flown by a cold fluid for causing condensation of moisture of treated pasta and the like food products on said second plurality of vertical plate means.

3. In a machine for drying pasta and the like food products comprising a pre-heater and a final drier, the combination of:

a substantially vertical hot labirinth section arranged downstream of said pre-drier, said hot labirinth section including lateral delimiting walls encircling a hot labirinth chamber accomodating a first plurality of vertical plate means extending parallel to each other and laterally separating between each other hot treatment sectors;

a first substantially horizontal connection portion having an inlet end connected to said hot labirinth section and an outlet end opposite to said inlet end;

a substantially vertical cold labirinth section connected at said outlet end of said first substantially horizontal connection portion, said cold labirinth section including insulated lateral delimiting walls encircling a cold labirinth chamber accomodating a second plurality of vertical plate means extending parallel to each other and laterally separating between each other substantially vertical cold treatment sectors for causing condensation of moisture of treated pasta and the like food article on said second plurality of vertical plate means;

a second substantially horizontal connection portion having an own inlet end connected to said cold labirinth section and an own outer end, opposite to said own inlet end, connected to said final drier;

conveyor means extending from said pre-drier to said final drier within said hot treatment sectors, said first substantial horizontal connection portion, said cold treatment sectors and said second substantially horizontal connection portion and defining a plurality of runs;

wherein each said vertical plate means comprises tubular elements and plate elements arranged side by side and defining closed partition walls extending in said labirinth chambers between said runs of said conveyor means, said tubular elements being flown selectively by hot and cold fluids.

* * * * *